United States Patent
Spears et al.

(10) Patent No.: US 6,257,601 B1
(45) Date of Patent: Jul. 10, 2001

(54) MOUNTING PLATE FOR ADJUSTABLY POSITIONING VEHICLE SUSPENSION STRUTS

(75) Inventors: Thomas G. Spears, Burr Ridge, IL (US); James R. Ryshavy, Cologne, MN (US)

(73) Assignee: Northstar Manufacturing Co., Inc., Minnetonka, MN (US)

( * ) Notice: Subject to any disclaimer, the term of this patent is extended or adjusted under 35 U.S.C. 154(b) by 0 days.

(21) Appl. No.: 09/376,206

(22) Filed: Aug. 18, 1999

(51) Int. Cl.$^7$ ................................................. B62D 17/00
(52) U.S. Cl. ............................. 280/86.752; 280/124.147
(58) Field of Search .......................... 280/86.75, 86.751, 280/86.752, 86.753, 124.147

(56) References Cited

U.S. PATENT DOCUMENTS

| | | | |
|---|---|---|---|
| 4,213,631 | * 7/1980 | Wilkerson | 280/86.752 |
| 4,372,575 | * 2/1983 | Hyma | 280/86.752 |
| 4,400,007 | 8/1983 | Ingalls. | |
| 4,817,984 | * 4/1989 | Ferman et al. | 280/86.752 |
| 4,946,188 | * 8/1990 | Key et al. | 280/86.752 |
| 4,953,889 | 9/1990 | Reilly. | |
| 5,484,161 | 1/1996 | McIntyre. | |
| 5,775,719 | * 7/1998 | Holden | 280/86.75 |
| 5,836,597 | * 11/1998 | Schlosser et al. | 280/86.753 |
| 5,975,548 | * 11/1999 | Galli et al. | 280/157 |

* cited by examiner

Primary Examiner—J. J. Swann
Assistant Examiner—David R. Dunn
(74) Attorney, Agent, or Firm—Haugen Law Firm PLLP

(57) ABSTRACT

An adjustable strut mounting plate for correcting at least one alignment parameter of a motor vehicle wheel assembly, with the adjustable strut mounting plate comprising an annular body adapted for secure attachment to the original strut mounting plate of the motor vehicle. The adjustable strut mounting plate includes a plurality of elongated ribbed adjustment bores through which bolts pass to secure the original strut mounting plate to the adjustable mounting plate. In addition, right hand and left hand tower mounting bores are provided in the adjustable strut mounting plate to accommodate attachment of the combined adjustable strut plate with the original strut plate to the vehicle tower.

3 Claims, 2 Drawing Sheets

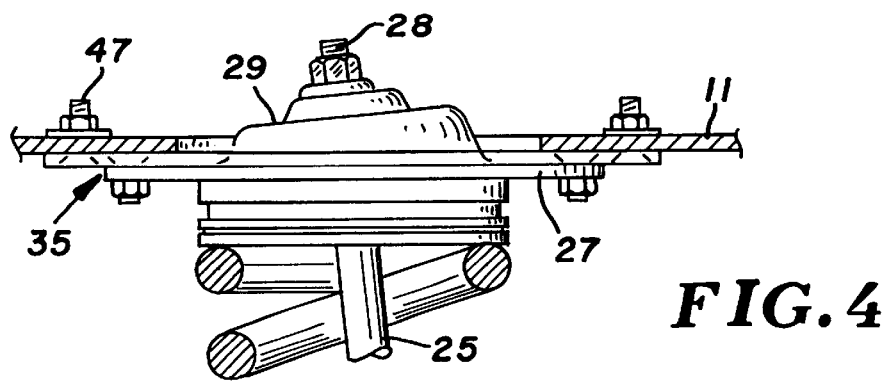
FIG.4
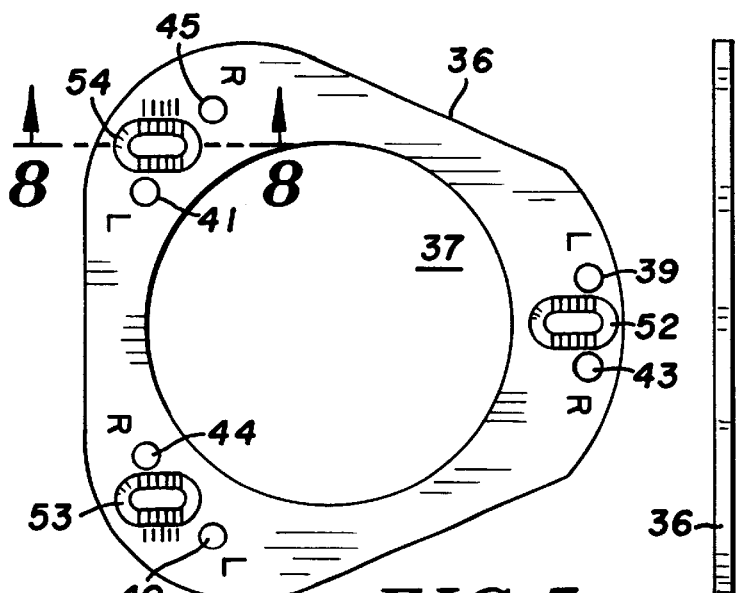
FIG.5
FIG.6
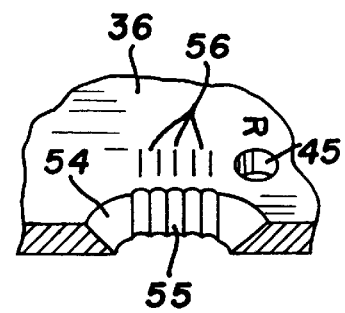
FIG.8
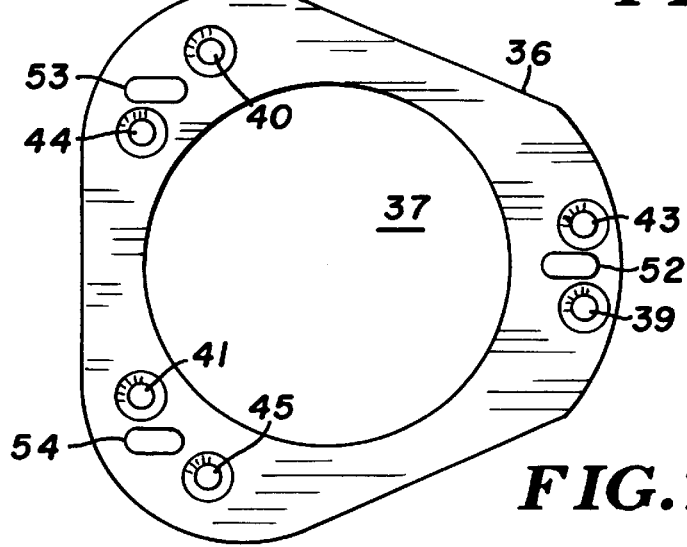
FIG.7

MOUNTING PLATE FOR ADJUSTABLY POSITIONING VEHICLE SUSPENSION STRUTS

BACKGROUND OF THE INVENTION

The present invention relates generally to an improved adjustable mounting plate for telescopic struts employed in motor vehicle suspensions, and more particularly to an adjustable strut mounting plate for those motor vehicles utilizing a suspension support mechanism with a telescopic strut assembly linking the chassis to the wheel assembly and being mounted concentrically within a helical coil spring support. The adjustable strut mounting plate of the present invention finds particular application in those vehicle suspensions equipped with McPherson-type struts. This type of suspension finds wide application in a large variety of motor vehicles, and is widely used as a component in the front suspension mechanisms of conventional automotive vehicles.

Strut suspensions typically employ a telescopic strut which includes a shock absorber arrangement or other motion dampener, and is used as a primary component for positionably mounting the bottom end of a steerable wheel assembly which includes a front wheel of a front-wheel drive automobile. In this arrangement, the strut is positioned concentrically within the normal helical main suspension spring, with the top of the strut being located and secured within a strut-receiving housing or "tower" which is formed integrally within the chassis of the vehicle to position the wheel assembly relative to the chassis. Typically, the strut tower is physically located within the engine compartment and the top of the strut has a mounting location arranged generally concentrically within the strut tower. In order to couple the upper end or top of the strut to the tower, the strut mounting components are secured within a strut mounting plate. The strut mounting plate is generally in the form of a flat annular plate, with a central opening into which the top of the strut is received and tightly secured. Because the strut is frequently subjected to shock loading during normal use, the top of the strut is coupled through the cut-out in the annular plate with a coupler surrounding a resilient grommet assembly, such as one comprising a durable rubber of relatively high durometer. The mounting plate also has fixed bores formed therein through which fastener bolts are received in mating relationship within the corresponding bores formed in the strut tower. The details of such assemblies are, of course, well known to those of skill in the art.

These strut assemblies have the disadvantage of providing only limited adjustability for alignment correction. Because of the nature of ordinary wear and tear, the loading to which the suspension system is put during normal use, and because of the occurrence of frequent minor impacts with solid objects due to conventional usage, alignment characteristics and adjustment will be found to vary from those as originally set by the vehicle manufacturer and beyond correction from the limited capability of factory systems. Due to these variations caused by and resulting from normal usage of the vehicle, capabilities to restore to proper alignment adjustment parameters are frequently lost. In order to maintain safety, reliability, and drivability, it is necessary to adjustably reposition the top end of the strut within the strut tower from time-to-time to restore the wheel assembly to the desired readings, particularly the camber setting. The improved mounting plates of the present invention enable the technicians to provide significant corrections in camber adjustments, with this expansion of correction capability being provided with a plate suitable for both right wheel and left wheel uses.

In typical strut assemblies, the lower end of the strut is coupled to the wheel assembly portion of the vehicle, with the mounting point generally being through a mechanism coupled directly to the steering knuckle. This lower mounting point is fixed in its location, and is generally not subject to relocation. The steering knuckle is, in turn, coupled to both the control arms and the distal or terminal end of the drive mechanism for a front-wheel drive vehicle.

Since the mounting point at the lower end of the strut is generally non-adjustable, there is need for an application wherein the upper end of the strut may, be reliably relocated in order to adjust alignment parameters, particularly the camber position and reading of the front wheels of the vehicle. While certain devices for this application have been proposed in the past, these applications have not been highly useful because of their limited application to either right hand or left hand use, and because of the lack of a relatively fixed adjustment mounting point. When the mounting point is fixed, the range of adjustment is extremely limited. Additionally, the devices proposed in the past frequently require alteration of either the mounting points, and/or cause significant repositioning of the wheel assembly because of their configuration. When the configuration causes a significant shift in the positioning of the strut mounting, adverse affects may result in the overall stability, steerability, and drivability of the vehicle. The device of the present invention provides an adjustable strut mounting plate which has fixed mounting bores therein to render it adaptable for both right hand and left hand mounts, and at the same time, providing a predetermined fixed location for positionably adjusting the camber setting for the wheel assembly of strut-type suspension mechanisms without requiring other adjustments or alterations in the alignment system.

SUMMARY OF THE INVENTION

In accordance with the present invention, an adjustable strut mounting plate is provided which comprises an annular body member having a generally centrally located opening. This adjustable mounting plate is designed to be adjustably superimposedly attached upon the original strut mounting plate of the vehicle. In addition to its larger central opening, the adjustable strut mounting plate of the present invention is provided with bolt receiving bores for coupling to the tower, and with a plurality of elongated bores through which the strut attachment fasteners may pass to become secured to the original plate. The original plate is thereby securely positioned within the elongated bores. In this arrangement, the original strut mounting plate is in face-to-face contact with the adjustable strut mounting plate of the present invention, and with the strut remaining attached to the opening in the original plate. Both plates are then secured to the strut tower through the mounting bores in the adjustable plate, and the entire assembly is then located and secured to the strut tower of the vehicle. The mounting mechanism for the top of the strut member per se remains rigidly and fixedly secured to the original plate. The elongated locking bores formed in the adjustable strut mounting plate provide for the adjustable positioning or repositioning of the original plate and attached strut, with the adjustable plate of the present invention being secured to the strut tower. In other words, the elongated locking bores provide for the adjustable and secure positional adjustment of the original plate and strut within the vehicle to achieve correction of the alignment camber parameter. For aid in repositioning the plate mounting fasteners within the adjustable mounting plate of the present invention, indicia are provided adjacent the elongated bore, with the indicia typically being in the form of strike marks indicating and/or representing the magnitude of camber correction achieved in the wheel assembly. Appropriate correction dimensions are calibrated and typically displayed on a chart or the like, in order to obtain and find correct and known response in the readjustment operation employing the improved adjustable strut mounting plate of the present invention.

In order to accommodate the strut mounting hardware in its displacement occasioned by the necessary adjustment, given the diameter or size of the mounting hardware, the central opening in the annular plate of the present invention will be greater than the diameter of that in the original strut mounting plate. This accommodates the wider range of repositioning of the strut mounting mechanism as it is necessarily received within the opening of the adjustable plate of the present invention.

For greater reliability and lifetime of the adjustment or alignment correction operation, the elongated bores are tapered inwardly in order to receive flat head screws therewithin. In order to lock these screws securely in place within the elongated bores, the tapered slot is provided with a series of notches which engage the inwardly tapered conical edge of the flat head bolts or screws. Thus, the original strut mounting plate, while being repositioned relative to the strut tower, will nevertheless be securely repositioned by virtue of the utilization of locking means for the attachment bolts or screws.

Therefore, it is a primary object of the present invention to provide an improved adjustable strut mounting plate for repositioning the upper or top end of a telescopic strut utilized in a vehicle suspension support, with the repositioning being accommodated in the strut tower as it is originally configured and formed in the vehicle chassis.

It is a further object of the present invention to provide an improved adjustable strut mounting plate for use with motor vehicles employing McPherson-type struts, wherein a single adjustable mounting plate is designed for use on either right hand or left hand applications, and with means being provided for controllably and adjustably repositioning the strut mounting position within the mounting tower.

Other and further objects of the present invention will become apparent to those skilled in the art upon a study of the following specification, appended claims, and accompanying drawings.

IN THE DRAWINGS

Figure 2:
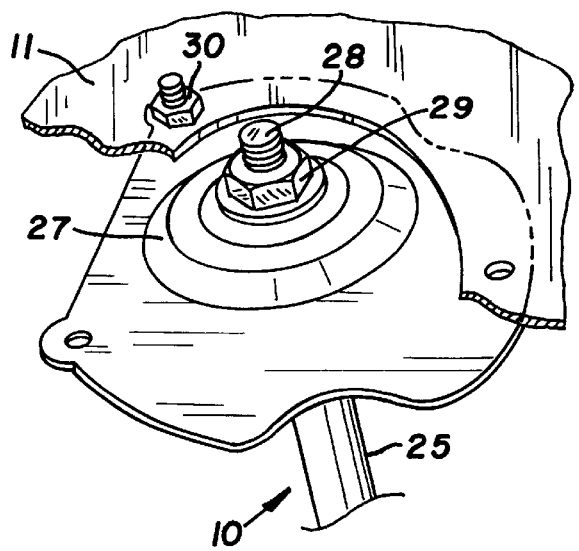
FIG. 2 is a detail perspective view of the original strut mounting plate and showing the detail of the top of a telescopic strut assembly mounted therewithin.
Figure 3:
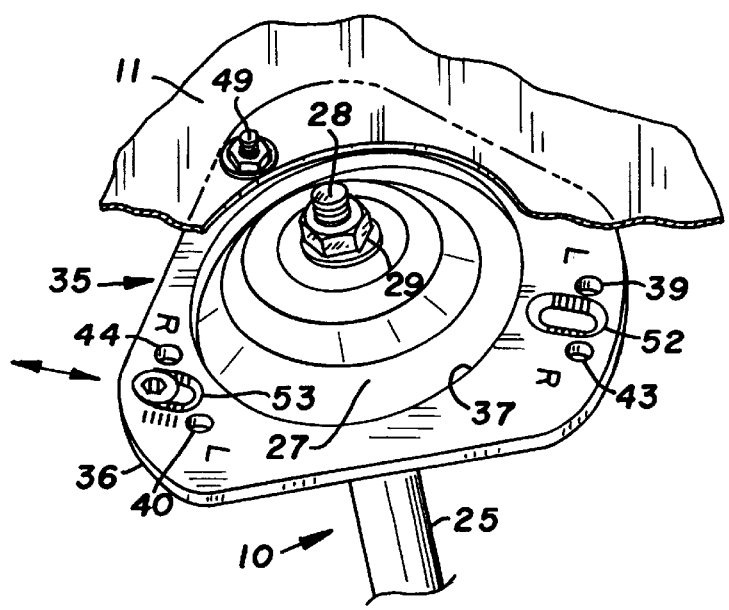

FIG. 3 is a view similar to FIG. 2, and illustrating the adjustable strut mounting plate of the present invention rigidly secured in superimposed relationship on the original strut mounting plate, with the outer configuration of the original plate being shown in phantom, with the repositioned strut mounting fasteners being shown being held within the adjustable mounting plate of the present invention, and with a fragmentary cut-away portion of the strut tower being shown;

FIG. 4 is a fragmentary detail side elevational view showing portions of the vehicle chassis, upper strut, helical spring, and strut attachment mechanism, and taken generally diametrically through the combination shown in FIG. 3 and on a slightly enlarged scale;

FIGS. 5, 6 and 7 are top plan, side elevational, and bottom views respectively of the adjustable strut mounting plate of the present invention; and FIG. 8 is a fragmentary perspective view on a slightly enlarged scale illustrating the configuration of the locking projections formed along the inner tapered periphery of the elongated screw receiving bores, that with the location of each of the grooves being indicated by a radially positioned calibrating surface strike mark.

DESCRIPTION OF THE PREFERRED EMBODIMENT

In order to describe the utility and application of the adjustable mounting plate of the present invention, reference should first be made to the features of the original system which is subject to readjustment through use and application of the present invention. With attention being directed to FIG. 1, a vehicle suspension system shown generally at 10 is utilized in a motor vehicle chassis, as shown at 11. The suspension support 10 includes a wheel assembly generally designated 13 coupled to the lower end of the support mechanism 10. A strut tower is formed within the chassis as at 14, with the strut tower being coupled to the upper end of the suspension support mechanism 10.

The wheel assembly includes a steering knuckle 16 to which the wheel rim (not shown) is mounted through mounting studs 17—17, with the assembly further including a brake rotor 18 and caliper 19. Steering knuckle 16 is, in turn, secured to lower link 20 through a subassembly including bolt 21 and associated bracket arrangement. Distal end of drive shaft 22 is, in turn, coupled through steering knuckle to the wheel assembly 16, with all of these features being, of course, conventional.

Figure 1:
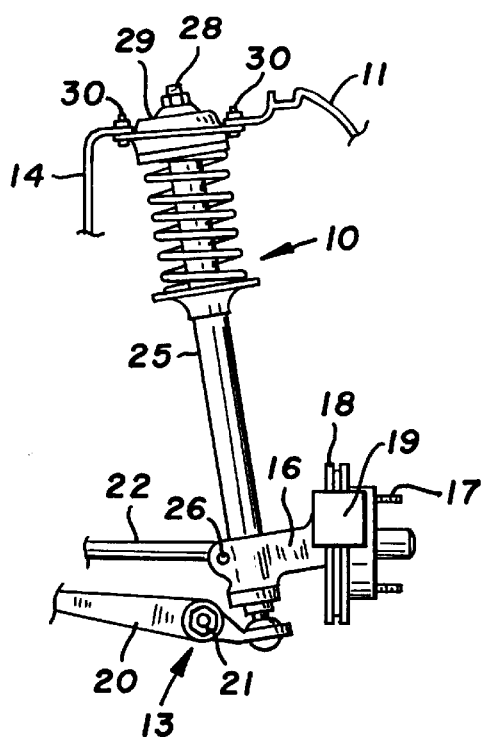
FIG. 1 is a front elevational view of a fragmentary portion of a vehicular wheel suspension and support mechanism, and illustrating the manner in which the suspension support is coupled to the wheel assembly through a strut and helical coil spring arrangement secured, in turn, to the steering knuckle.

Strut 25 is secured at its lower end to steering knuckle 16 through pinch bolt 26, and at its upper end to strut tower 11 through original mounting plate 27. For accommodating shock loading, the upper terminal or top pin portion of strut 25 as at 28 is secured to plate 27 within durable grommet member 29 through conventional means. This arrangement secures strut 25 to original strut mounting plate 27. A plurality of fasteners in the form of bolts pass through or are secured to original plate 27 and into strut tower 11. These bolts are shown at 30—30. These features, in turn, represent prior art, and are illustrated in FIGS. 1 and 2. In certain vehicle designs, a plate with bores providing some limited adjustment may be provided on the upper surface of the strut tower, with these plates typically being spot-welded in place. Even though some limited or minor adjustments may be facilitated by these plates, their design is such that adjustments are typically time consuming. The prior art designs represented in FIGS. 1 and 2 are shown without adjustable plates in position.

Turning now to the features of the present invention, an adjustable strut mounting plate in accordance with the present invention is shown generally at 35, with the plate providing an annular body of plate 36 and a generally centrally located opening as at 37. The diameter of opening 37 is greater than the corresponding central opening in original strut mounting plate 27, in order to accommodate displacement and repositioning of the strut within the combined system, as set forth below. This plate is mounted in place between original mounting plate 27 and the chassis and/or strut tower 11.

Given the greater diameter of opening 37, the adjustable strut mounting plate 35 is designed to positionably receive and circumscribe the upper end of the strut 10 including its top end 28 and mounting components as at 29. A plurality of tower attachment bores are formed within the body 36 as at 39, 40 and 41. This is a first plurality of tower mounting bores and corresponds to the mounting bores to be employed on the left side of the vehicle for attachment to the tower. Correspondingly, a second plurality of mounting bores is shown at 43, 44 and 45, with this second plurality of bores being provided for similar use on the right side of the vehicle. The interbore spacing spans for these first and second plurality of bores replicate or coincide with the spacing spans of the mounting bores in the original strut mounting plate, and are arranged and adapted to receive fasteners to securely clamp or mount the combined original mounting plate 27 and adjustable mounting plate 36 through the original mounting openings in tower 11.

Fasteners are provided to secure the adjustable plate 36 to the original plate 27, with this plurality of fasteners or bolts being shown at 47, 48 and 49 (FIG. 3). These fasteners are preferably in the form of flat-head bolts or screws, thereby presenting a uniform flat profile along the upper surface of plate 27. These fasteners lockingly engage and mate with notches formed in elongated slots described hereinafter.

With attention now being directed to FIGS. 5 and 7 of the drawings, a plurality of elongated adjustment bores are shown as at 52, 53 and 54, with the location of these elongated bores being offset from the tower mounting bores, and with each having notched or scalloped internal edges as shown in FIG. 5 for matingly receiving the conical heads of screw fasteners. Such screw fasteners provide a secure locking engagement between the internal scalloped edges 55 of the elongated bores for clamping engagement with the adjustable strut mounting plate to the original strut mounts, and accordingly controllably re-orient the location of the upper end of the entire strut assembly within the strut tower.

In order to provide for controlled or predetermined relocation of the strut top in the adjustable plate, a plurality of strike marks 56 are provided as indicia representing the distance from the original bores, and accordingly indicate the alignment or camber correction achieved through relocation. Thus, the indicia indicates the magnitude of camber correction of the wheel within the associated wheel assembly, and hence serves to guide the technician in utilizing the adjustable mounting plate of the present invention to achieve the appropriately desired camber correction in the wheel assembly.

In order to complete the assembly, flat head screw fasteners are provided, with these fasteners, such as at 47, 48 and 49, in turn, extending through openings such as at 52, 53 and 54, and ultimately through the original mounting holes formed in the original strut plate of the original vehicle chassis assembly. In other words, the adjustable mounting plate is provided with fasteners at a strut re-orienting position within the elongated bores. The combined assembly is ultimately secured to the chassis through the first or second plurality of tower mounting bores in the adjustable plate 36 of the present invention. Thus, the camber correction or readjustment is obtained.

TYPICAL APPLICATION

For utilization of the device of the present invention, the following steps are followed:

1. Do pre-alignment checks on the vehicle to determine amount of camber change required.
2. Remove pinch bolt (26) holding strut assembly (10) into knuckle (16). Remove brake wires and remove upper end of sway bar link from strut. Removal of the tie rod end from the steering arm is recommended at this point.
3. Remove the three nuts holding upper end of strut assembly to tower and remove strut from vehicle, and install in suitable holder.
4. Using tie rod removal tool or other suitable tool, press mounting studs out of original strut plate.
5. Set the adjustable strut plate of the present invention on top of original strut plate with indicia showing and with the mounting bores in matching disposition. From the underside of the original plate, install long bolts through the holes appropriate for left or right mounting, depending upon which side the strut is being worked on.
6. The elongated bores are provided with a number of slotted camber positions, for example, five. Install Allen bolts through the adjustable plate in the position needed for the desired camber change.
7. Place the adjustable strut plate on top of the original strut plate with the ribbed bolts extending through the holes of the original strut plate. Install nuts on bottom of the short bolts and tighten.
8. Take strut from holder to vehicle and install into strut tower. Reinstall knuckle into lower end of strut using appropriate tools. Reinstall in an ABS wiring, sway bar bracket, and tie rod end, as appropriate.
9. After reinstallation, re-check camber. While not typically required, it is sometimes desirable to recheck castor readings, and if castor reading needs readjustment, loosen and re-attach subframe mounting bolts as appropriate. If castor reading is low on one side, slide subframe toward the back end of vehicle with suitable prying mechanism and re-attach. If castor reading is high, loosen mounting bolts on that side and slide side forward. If camber readings, as re-checked, do not come out exactly as desired, the subframe can be slid from side-to-side with the alignment machines in use having appropriate bar graphs to assist in that readjustment.
10. Re-check camber and castor readings to verify appropriate alignment corrections.

It will be appreciated that the camber adjustment plate of the present invention can be employed in a variety of suspension mechanisms, and that the examples given herein are for purposes of illustration only, and are not to be construed as a limitation upon the interpretation or construction of the appended claims.

What is claimed is:

1. In combination with a motor vehicle having a chassis, a suspension support mechanism which includes a wheel assembly coupled to the lower end of said suspension support mechanism, a strut tower formed within the chassis and coupled to the upper end of said suspension support mechanism, said strut tower including first mounting bores, said suspension support mechanism including a helical coil spring and a telescopic strut assembly mounted concentrically within said helical coil spring, an original strut mounting plate comprising an annular plate having a central opening of a first diameter and a plurality of strut bolt fastener bores formed therewithin for mounting the upper end of said telescopic strut assembly at a normal position within said strut tower; the improvement comprising an adjustable strut mounting plate for use in combination with said original strut mounting plate for correcting the position of the wheel in said wheel assembly:

(a) said adjustable strut mounting plate comprising an annular body with a generally central opening with a diameter greater than said first diameter for positionably receiving and circumscribing the upper end of said telescopic strut;

(b) a plurality of tower engaging bolt receiving mounting bores formed within the annular body of said adjustable mounting plate with spacing spans replicating the spacing spans of said strut bolt fastener bores in said original strut mounting plate and the spacing spans of said first mounting bores in said strut tower for receiving fasteners therein for securely mounting said adjustable strut mounting plate in place in said strut tower;

(c) a plurality of elongated camber adjustment bores offset from said tower engaging bolt receiving mounting bores and having scalloped internal edges for matingly receiving screw fasteners for mating and locking engagement with the internal scalloped edges of said elongated bores for clamping engagement of said adjustable strut mounting plate to said original strut mounting plate, and to controllably re-orient the location of the upper end of said telescopic strut assembly within said strut tower; and (d) strike mark indicia adjacent said elongated bores for indicating the position representing magnitude of camber correction relative to the original camber setting of the wheel assembly of said motor vehicle.

2. The combination as set forth in claim 1 being particularly characterized in that said elongated bores are provided with indicia for indicating the magnitude of camber correction of the wheel mounted in said wheel assembly.

3. The combination as set forth in claim 1 being particularly characterized in that first and second pluralities of tower engaging bolt receiving mounting bores are provided for right hand mounting and left hand mounting respectively of said annular body within said tower, with each said plurality of bores replicating the spaced location of respective said strut tower mounting bores in right and left sides of said vehicle.

* * * * *